Dec. 30, 1947. B. I. J. STAMM 2,433,405
SAFETY GRAVITY CONTROLLED VALVE
Filed June 5, 1944 4 Sheets-Sheet 1
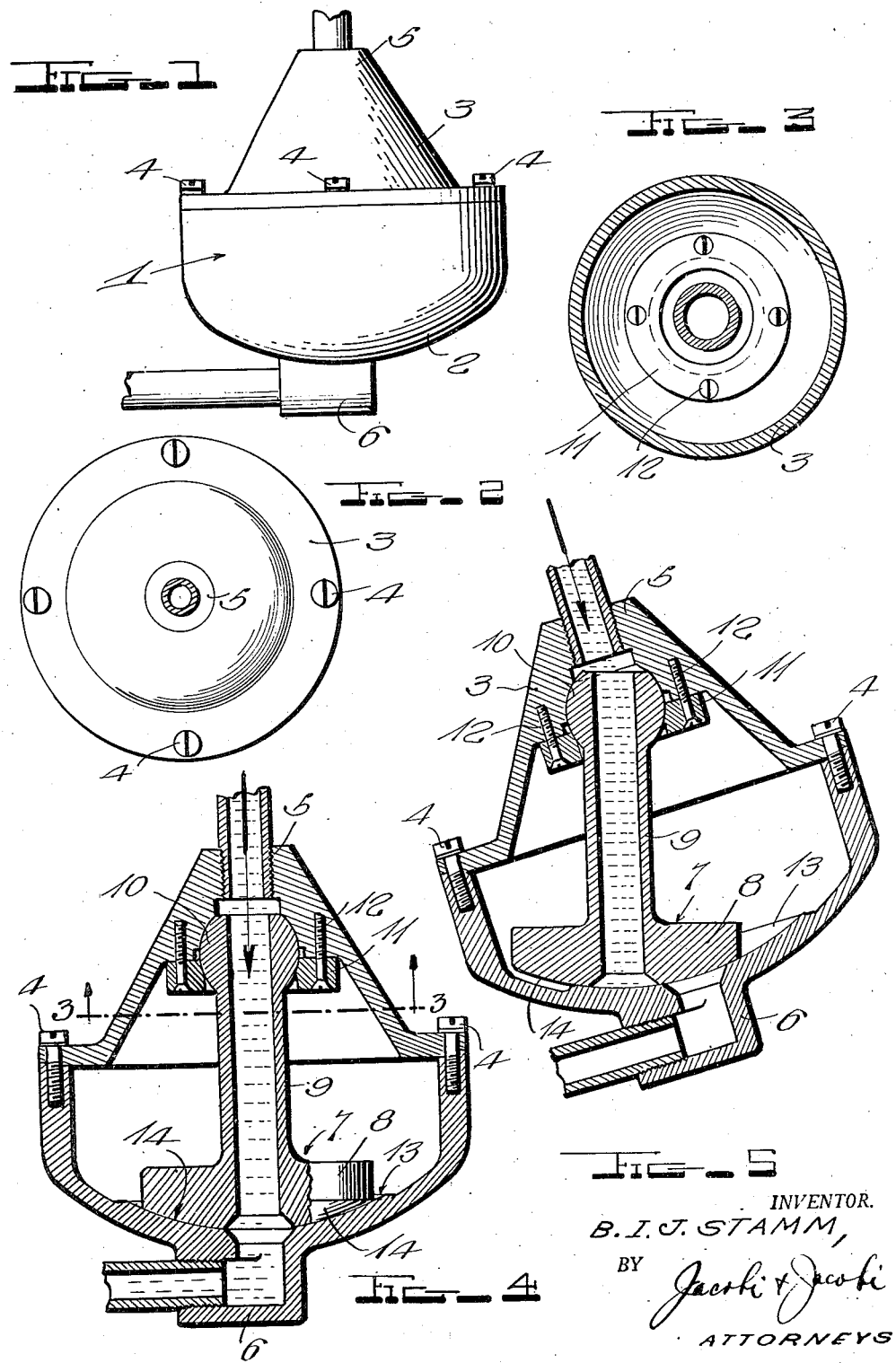
INVENTOR.
B. I. J. STAMM,
BY Jacobi & Jacobi
ATTORNEYS

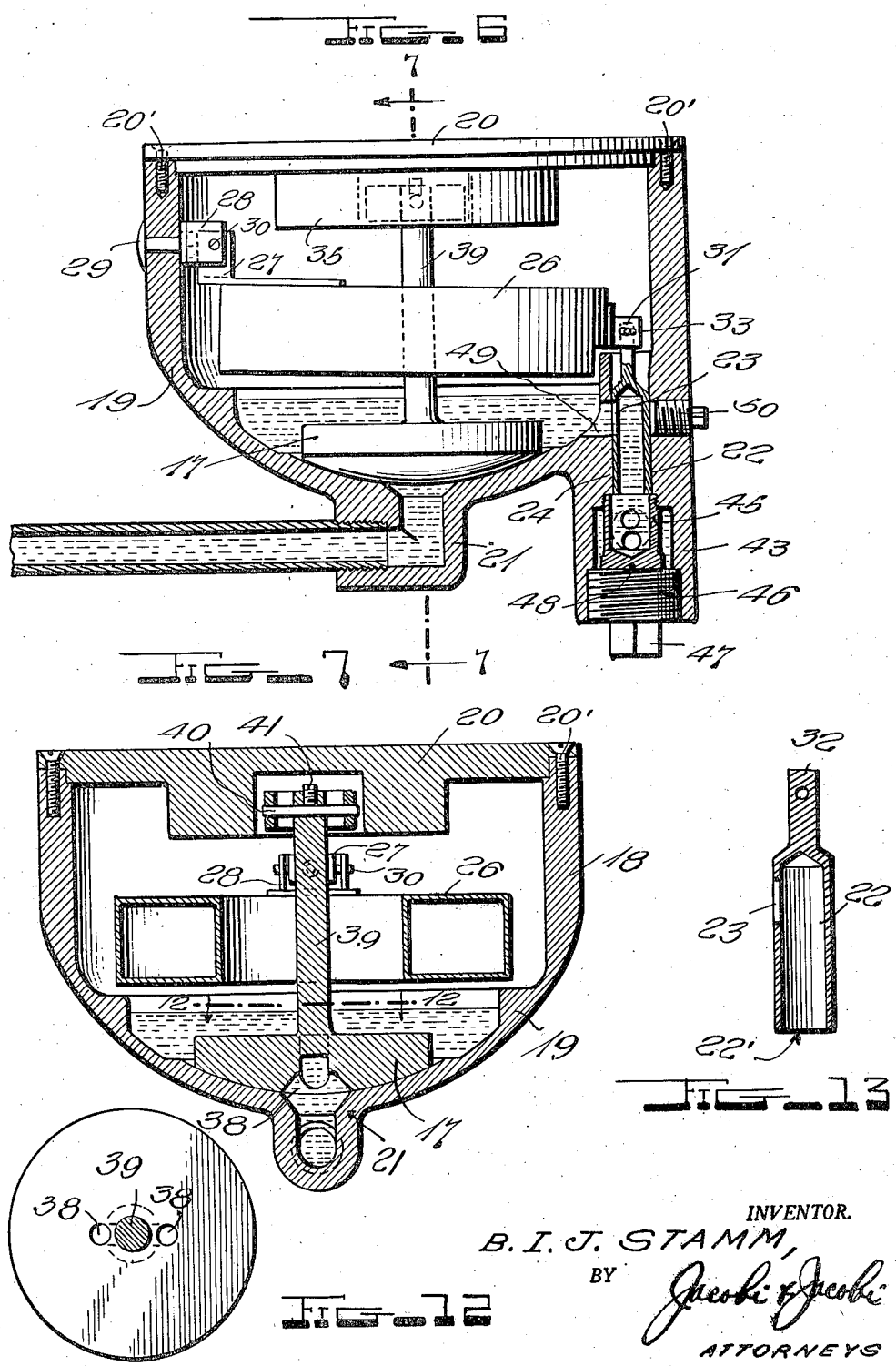

Dec. 30, 1947. B. I. J. STAMM 2,433,405
SAFETY GRAVITY CONTROLLED VALVE
Filed June 5, 1944 4 Sheets-Sheet 3
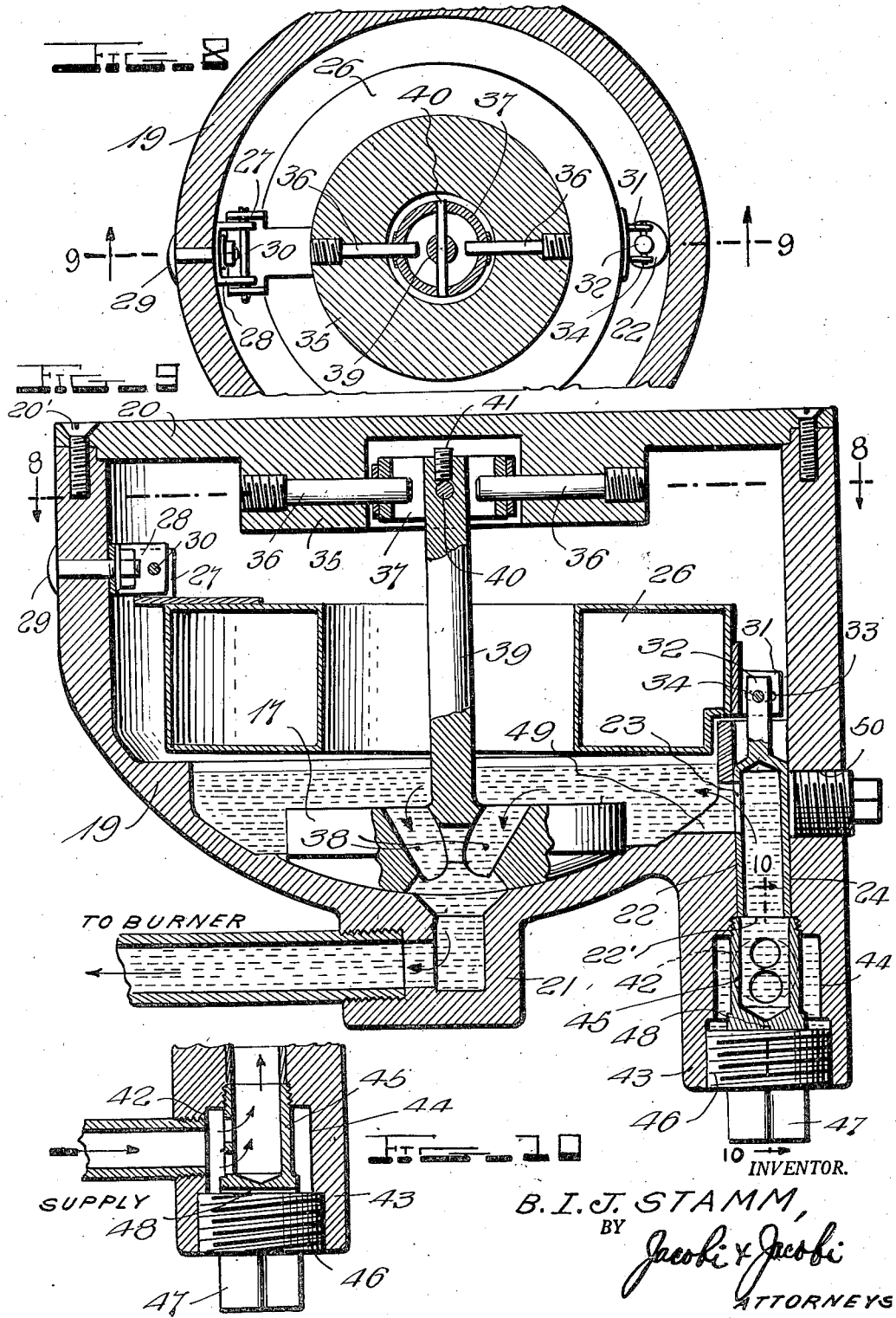
INVENTOR.
B. I. J. STAMM,
BY
Jacobi & Jacobi
ATTORNEYS Dec. 30, 1947.  B. I. J. STAMM  2,433,405
SAFETY GRAVITY CONTROLLED VALVE
Filed June 5, 1944  4 Sheets-Sheet 4
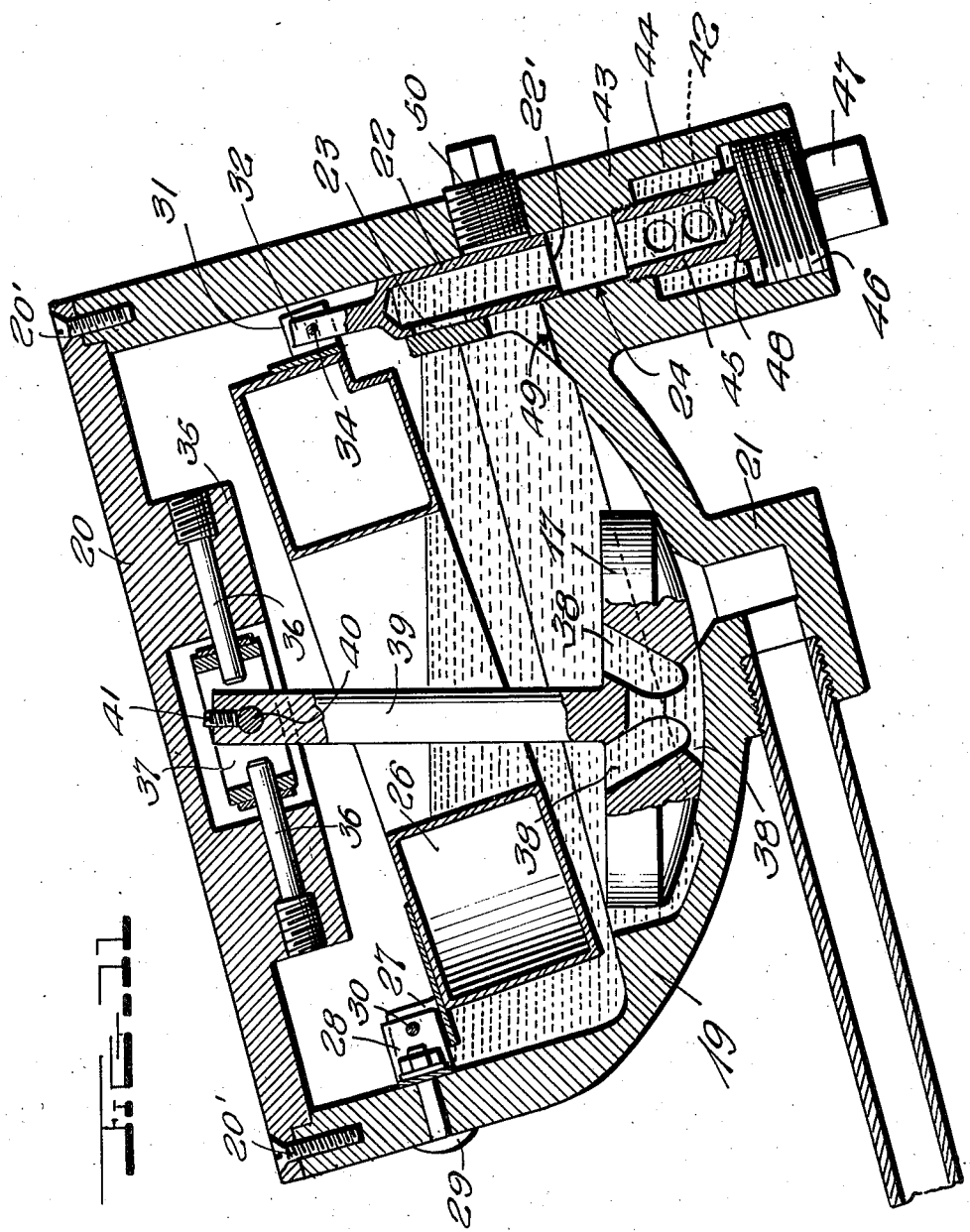
INVENTOR.
B. I. J. STAMM,
BY Jacobi & Jacobi
ATTORNEYS Patented Dec. 30, 1947

2,433,405

UNITED STATES PATENT OFFICE 2,433,405

SAFETY GRAVITY CONTROLLED VALVE

Benjamin I. J. Stamm, New York, N. Y.

Application June 5, 1944, Serial No. 538,846

6 Claims. (Cl. 137—139)

It is an object of this invention to produce a new and improved safety control valve having gravity actuated means to automatically control the flow of fluid through said valve.

It is an object of this invention to produce a new and improved automatically controlled valve for use on ships, planes, trailers or any movable device or mobile body where the fluid flows by gravity or pressure and in which the fluid flow may be controlled automatically by the action of gravity on the relatively movable parts of the valve.

It is an object of this invention to produce a new and improved valve having an inlet portion and an outlet portion in which a tiltable universally suspended valve element cooperates with the outlet portion to automatically control the outlet by the action of gravity when the valve is tilted by the movable device in which said valve is mounted.

It is also an object of this invention to produce a new and improved feed control valve for tanks, carbureters, oil burners, receptacles, etc., when mounted on movable conveyances.

Other features of novelty and utility will be apparent from a detailed description of the accompanying drawings in which:

Figure 1 is a side view in elevation of one embodiment of my invention.

Figure 2 is a plan view thereof.

Figure 3 is a sectional view taken on the line 3—3 of Figure 4, looking in the direction of the arrows.

Figure 4 is a longitudinal, vertical section through the axial center of my invention showing both the inlet portion and outlet portion open.

Figure 5 is a section similar to that of Figure 4 showing the valve tilted and both the inlet portion and outlet portion closed.

Figure 6 is a vertical longitudinal section through the center of another embodiment of my invention.

Figure 7 is a vertical section transversely of my invention taken on the line 7—7, looking in the direction of the arrows as shown in Figure 6.

Figure 8 is a transverse longitudinal section, on a reduced scale, taken on the line 8—8 looking in the direction of the arrows as shown in Figure 9.

Figure 9 is a longitudinal vertical section, on an enlarged scale, through the longitudinal center of my invention as indicated by the line 9—9 of Figure 8, portions of the central valve element being broken away to disclose the exit orifice through said valve element.

Figure 10 is a vertical section of the inlet portion of my device taken on the line 10—10 looking in the direction of the arrows shown in Figure 9.

Figure 11 is a sectional view similar to that shown in Figure 9, except that the valve is tilted and the outlet portion is closed.

Figure 12 is a section on the line 12—12 of Figure 7, looking downwardly on the head of the valve element, showing the exit orifices in said valve head.

Figure 13 is a vertical section of the tubular inlet valve element used in one embodiment of my invention.

The preferred embodiment is illustrated in Figures 1 to 5, inclusive, and comprises a valve 1 having a bottom section 2 and a top section 3 bolted together by lag bolts or screws 4 to form a fluid tight joint between said sections.

The valve is provided with an inlet portion 5 in the top section 3 and an outlet portion 6 in its bottom section. Within the valve is located a valve element 7 having a weighted head 8 formed integral with a hollow stem 9. The upper portion of the stem 9 is provided with a spherical end portion 10 secured by a ring 11 to the upper portion of the valve. The ring 11 is fastened to the top section 3 by lag bolts or screws 12, said ring and top section forming a socket. The valve element 7 is mounted for limited swinging pendulum-like movement in any arcuate direction from its central axis as clearly disclosed in Figure 5.

The lower section 2 is provided with a valve seat or face portion 13 defining a spherical surface portion subtended by a radius extending from the center of the spherical end portion 10. The element 7 is provided on its head 8 with a complemental spherical valve face 14 cooperatively related to the face 13. The clearance between these valve faces 13 and 14 need not exceed .003 of an inch.

It will be noted that the valve element 7 is weighted and gravity actuated to control both the inlet and outlet of the valve 1. Of course, to get this desired automatic gravity control of flow to and from the valve 1, the valve is secured in fixed position on or in mobile body or movable device such as an airplane, a dirigible balloon, ship, automobile, trailer, etc.

It will be seen that this valve construction is well adapted as a feed control valve for carburetors, oil burners, tanks, receptacles, etc. when mounted on movable conveyances.

The embodiment of my invention as disclosed in Figures 6 to 13, inclusive, is similar to the embodiment disclosed in Figures 1 to 5, inclusive, in that the pendulum valve element 17 bears the same functional relation to the valve casing section 19 as that previously described.

In this embodiment the valve 18 comprises a bottom section 19, a top section 20, a valve element 17 controlling an outlet portion 21 and a float controlled inlet portion 43 having a hollow cut-off valve 22 having an inlet end 22' and an outlet orifice 23. This cut-off valve 22 is slidably fitted in a bore 24 of the lower or bottom section of the valve casing. An annular float 26 is pivotally mounted by brackets 27 and 28 as clearly shown in Figures 6 and 9. The bracket 28 is secured to the valve section 19 by a headed bolt 29 and the bracket 27 may be soldered to the hollow annular float 26 and the brackets are pivotally connected by a transverse pin or rivet 30.

Diametrically opposite from the float pivotal connection the float 26 is provided with a slotted ear 31 preferably bifurcated to receive an apertured extension 32. The ear 31 is provided with a slot 33. The extension 32 receives a pin 34 which slidably and pivotally engages the slots 33 in the ear 31. The pin 34 preferably has a driving fit in the apertured extension 32. Of course, an ordinary bolt may be substituted for the transverse pin 34.

The top section 20 is secured to the bottom section 19 forming a fluid tight joint and is fastened in position by lag bolts 20'. The top section 20 is provided with a depending recessed hub 35 forming supports for pins 36 threaded into the hub 35 as shown in Figures 9 and 11. The pins 36 engage an apertured ring 37 and pivotally support said ring within the recessed hub.

The pendulum valve element 17 is provided with a duplex exit orifice 38 in its head and a solid stem 39 extending transversely from said head and connected to the ring 37 by a transverse pin 40 secured in the stem 39 by a set screw 41.

The universal joint connecting the stem 39 and the hub 35 represents one of a variety of universal joints more specifically and technically known as a gimbal.

The inlet port 42 in one side of the depending nipple or inlet portion 43 is shown in dotted lines in Figures 9 and 11 and is shown in full lines in Figure 10. The inlet port 42 is screw threaded to receive one end of a threaded supply tube as clearly shown in Figure 10. The lower portion of the nipple 43 is provided with a stepped bore 44. The stepped upper end portion of the bore is screw threaded to receive a laterally apertured thimble 45. The stepped lower end of the bore portion is also screw threaded to receive a screw threaded closure plug 46. The plug 46 is provided with a polygonal portion 47 to receive a wrench and the thimble 45 is provided with a screw driver kerf 48.

The inlet portion 43 also forms a housing or guide means for the hollow slide valve element 22. Said housing is provided with a lateral port 49 leading into the chamber formed by the bottom section 19 of the valve 18. When the float 26 and the hollow cut-off valve 22 are both in their lowermost position the orifice 23 and the port 49 are in alignment so that liquid can flow freely into the valve 18.

The liquid flows into the valve 18 by gravity from a supply tank or the like, which may be twelve inches to eight feet above the outlet portion of the valve 18.

When the outlet portion is closed by the tilting of the valve 18 and the swinging or oscillation of the pendulum valve element 17, the incoming liquid, because of greater specific gravity than the float structure 26, forces the float 26 upwardly which carries with it the cut-off valve element 22, thereby cutting off or at least retarding the supply of liquid. It is to be noted that the float 26 and valve element 22 when closing move in the same direction as the flow of liquid; therefore, both the float 26 and the valve element 22 are actuated by the force of gravity.

The step bored nipple 43 is adapted to receive a fine cylindrical screen or filter (not shown) to be located in spaced surrounding relation to the thimble 45 and supported by the plug 46. The screen or filter should be as long as the unthreaded portion of the thimble 45 and also spaced from the wall of the bore 44.

The port 49 is preferably produced by a suitable drill. Since a feasible manner of making the bored port 49 is by drilling at the proper position through the bottom section of the valve 18, it is necessary to close the outside portion of the drilled aperture by a plug or the like. For this purpose I have selected a screw threaded plug 50 fitted to a complemental screw threaded portion of the aperture. Since this port making feature is merely a manufacturing expedient, other and different expedients may be adopted if desired.

The valve 18 may be made of any suitable metal but I have selected bronze as being the most preferable since it may be molded and machine finished and polished without any particular difficulty.

Having shown and described my invention, what I claim is:

1. In a gravity controlled valve having an upper portion formed with an inlet and a bottom portion formed with an outlet therein, in combination with a tiltable valve element having a valve stem and a valve head, said stem being joined to the top portion of said valve by a universal joint about the inlet, said bottom portion about the outlet and said valve head having cooperating face portions defining portions of a spherical surface subtended substantially by a radial line from the center of the universal joint to the cooperating face portions, and the valve element being formed with a longitudinally extending passage having its upper end communicating with the inlet and its lower end moving into and out of registry with the outlet as the valve member moves.

2. A gravity controlled valve having an inlet portion in its top and an outlet portion in its bottom, a pendulum gravity actuated valve element interposed between said inlet and outlet portions, said valve element having a bore therethrough communicating with said inlet portion and communicatable with said outlet portion, said valve element being suspended from and connected to said inlet portion by a universal joint construction, said valve element and said outlet portion having cooperating complemental spherical surface portions, whereby the tilting of the valve will retard or cut-off the outlet flow of fluid by the gravity actuation of the pendulum valve element.

3. A gravity controlled valve having an upper section and a lower section detachably secured together, said sections having inlet and outlet portions, respectively, located in opposed relation to each other in combination with a pendulum gravity actuated valve element suspended from and connected to the top portion of the upper section by a universal joint, said valve element having a bore extending axially through said element and communicating with the upper inlet portion and communicatable with the outlet portion, to control said outlet by gravity actuation of said valve element when said valve is tilted.

4. A gravity controlled valve having an upper dome-shaped section and a lower section defining a chamber, said sections being detachably connected together, the upper section having an inlet portion in its top and the lower section having an outlet portion in its bottom in combination with a pendulum valve element interposed between said inlet portion and said outlet portion, said valve element having a bore extending axially through said valve element and being in communication with the inlet portion and communicatable with the outlet portion to control the flow of fluid through said outlet portion when the valve is tilted.

5. A gravity controlled valve having a dome-shaped upper section and a lower section defining a chamber, said upper section having an inlet portion in its dome and said lower section having an outlet portion opposite to the inlet portion, said sections being detachably secured together, in combination with a valve element interposed between said inlet portion and said outlet portion, said valve element having a bore longitudinally therethrough, said valve element having a sphere-like portion at its upper end, said upper section having a socket portion about its inlet portion, said sphere-like portion fitted into said socket and defining a universal joint for limited oscillating movement of said element in every direction, the other end of said valve element having a spherical portion cooperating with a complemental portion in the lower section, to control the outlet as the valve is tilted.

6. In a gravity controlled valve having an upper section and a lower section defining a liquid chamber having an inlet at its top surrounded by a socket and an outlet at its bottom surrounded by a concaved arcuate seat, the outlet being controlled by a pendulum valve element having a head bearing against the valve seat and a stem extending upwardly therefrom, the upper end of said stem being formed with a sphere mounted in the socket, said connection having the physical and functional qualities of a universal joint whereby said valve element is mounted for limited swinging movement in any direction, there being a passage extending longitudinally through the stem and the valve head and having its upper end at all times communicating with the inlet and its lower end moving into and out of communication with the outlet to control the outlet when said valve is tilted.

BENJAMIN I. J. STAMM.

REFERENCES CITED

The following references are of record in the file of this patent:

UNITED STATES PATENTS

| Number | Name | Date |
| --- | --- | --- |
| 2,020,286 | Bittle | Nov. 12, 1935 |
| 668,115 | Netrefa | Feb. 12, 1901 |
| 1,447,797 | Loudon | Mar. 6, 1923 |
| 1,908,762 | Johnston | May 16, 1933 |
| 2,088,528 | McCune | July 27, 1937 |
| 2,082,723 | Seward | June 1, 1937 |
| 1,914,736 | Coutu | June 20, 1933 |

FOREIGN PATENTS

| Number | Country | Date |
| --- | --- | --- |
| 327,547 | Italy | Jan. 26, 1935 |